United States Patent [19]
Fogel et al.

[11] 3,969,844
[45] July 20, 1976

[54] SOIL TREATMENT METHODS

[75] Inventors: Samuel Fogel, Newton; Patricia L. Foster, Cambridge; Paula Schenck, Boston; William W. Walker, Jr., Allston, all of Mass.

[73] Assignee: American Bioculture, Inc., Plumsteadville, Pa.

[22] Filed: May 1, 1975

[21] Appl. No.: 573,609

Related U.S. Application Data

[63] Continuation of Ser. No. 434,332, Jan. 17, 1974, abandoned, and a continuation-in-part of Ser. No. 421,527, Dec. 4, 1973, abandoned.

[52] U.S. Cl. .................................... 47/58; 47/1.4; 47/DIG. 10
[51] Int. Cl.² .......................................... A01G 7/00
[58] Field of Search .................. 47/1.4, DIG. 10, 58

[56] References Cited
UNITED STATES PATENTS

| | | | |
|---|---|---|---|
| 2,732,661 | 1/1956 | Spoehr et al. | 47/58 |
| 2,908,113 | 10/1959 | Martin | 47/58 |
| 3,197,309 | 7/1965 | Chapman et al. | 47/1.4 X |
| 3,546,812 | 12/1970 | Kobayashi et al. | 47/1.4 |
| 3,732,089 | 5/1973 | Megronigle | 47/1.4 X |
| 3,820,281 | 6/1974 | Bigler et al. | 47/58 |

Primary Examiner—Robert E. Bagwill
Attorney, Agent, or Firm—Synnestvedt & Lechner

[57] ABSTRACT

Culturing an alga with known flocculant production capability on the soil for the purposes of aggregating soil particles is disclosed. According to the disclosure, flocculant producing algae are known in liquid culture medium as disclosed in pending application Ser. No. 421,527 filed Dec. 4, 1973. The nitrogen in the culture medium is maintained so that cellular nitrogen does not fall below 10%. The algae are then inoculated onto soil which is provided with supplemental nutrients and moisture sufficient to produce a multiplication on the order of several hundred fold. The nutrients other than nitrogen are provided in sufficient quantity to permit a further period of growth during which algal flocculants are produced which have the property of binding soil particles into workable aggregates.

9 Claims, 6 Drawing Figures

SOIL TREATMENT METHODS

FIELD OF THE INVENTION

This application is a continuation of application Ser. No. 434,332, filed Jan. 17, 1974, which was a continuation-in-part of our co-pending application Ser. No. 421,527 filed Dec. 4, 1973. These applications have been abandoned.

As in our co-pending application, the invention relates to the production and use of algae as a source of polymeric materials displaying strong flocculating activity. According to the invention, soil to be treated is inoculated with flocculant producing algae and grown in the presence of nitrogen, other nutrients and sufficient moisture so as to cause the algae to multiply on the soil. After a period of multiplication, the algae are cultured for a further period of time under conditions which promote flocculant production. These algal flocculants improve soil structure by binding soil particles into workable aggregates.

As indicated in our co-pending patent application, utilization of bacterial polysaccharides as flocculating agents, especially for aggregating soil particles, thereby improving soil structure is known. Patents such as U.S. Pat. No. 2,780,888 and U.S. Pat. No. 2,901,864 teach the application of these bacterially produced biopolymers to the soil as a means for promoting soil aggregation, thereby producing a granular structure which is sufficiently porous to allow air, water, and plant roots to penetrate through the soil. According to these patents, sucrose as a raw material is converted to dextran by innoculating a nutrient medium containing sucrose with a dextran synthesizing bacteria such as *Leuconostoc mesenteroides*. The dextran may be used in granular form or in solution in an aqueous medium and applied to soil.

In addition to the foregoing, long chain synthetic polymers useful as soil conditioning agents which are capable of aggregating soils and useful for other applications where flocculating activity is required, are disclosed in the art. Examples of synthetic polymeric materials useful for increasing aggregation in surface soil are disclosed in Hedrick et al U.S. Pat. No. 2,651,885. According to the Hedrick et al patent, water soluble polymeric electrolytes having a molecular weight of at least 10,000, including polymers of acrylic acid, copolymers of maleic anhydride and the like are provided. These polymeric materials are effective in improving soil structure but their use has been somewhat limited in view of their high cost.

Various researchers have also recognized that algae found in the soil influence the soil in a variety of ways. Shields and Durrell (L. M. Shields and L. W. Durrell, BOTANICAL REVIEW, 30, 1964, pp. 92–128) in a systematic and thorough review of soil algae literature have described eight major contributions which algae make to soil. These include:

1. Colonization of denuded soils with formation of a soil crust which acts as a substrate for later successional species; that is, seed germination on an algae substrate.
2. Formation of a soil humus resulting from the microbial decomposition of algae and subsequent formation of protein-polysaccharide-clay and sand aggregates.
3. Improving water infiltration through algal covered surfaces as a result of water stable aggregate formation as well as a reduction of runoff and erosion.
4. Maintenance of a reserve supply of nutrients in a partially available form for higher plants.
5. Prevention of nitrate nitrogen from leaching and ammonia nitrogen from volatilizing by converting them to organic forms.
6. Fixation of atmospheric nitrogen by blue-green soil algae with significant increases noted in soil nitrogen.
7. Production of both nitrogen and oxygen in rice agriculture.
8. Maintenance of high soil moisture levels as a result of surface cover through which germinated seeds can penetrate.

It has also been observed that algae organic matter occuring on soil contribute to soil structure by binding soil particles. It has been reported that surface algae growths in Oklahoma, Kansas, and Texas reduced erosion losses due to their aggregating effect on soils. Water infiltration was increased in algae covered plots over exposed surfaces. Algal invasion of the rain-crust has been seen to result in improved infiltration, decreased erosion, and has aided in the establishment of plant seedlings under vigorous desert conditions.

OBJECTS OF THE INVENTION

The primary object of this invention is the provision of a treatment method involving the application of flocculant producing algae to the soil for the purpose of promoting soil particle aggregation.

A related object of the invention is the provision of a soil treatment method involving the growth of flocculant producing algae on the soil, thereby producing multiplication of the algae and production of flocculants.

These and other objects achieved by the present invention, are based on our discovery that algae can be cultured so as to favor the production of flocculants. The present invention further involves the production of algae which are inherently good flocculant producers, culturing these algae under conditions favoring cell multiplication on the soil until a desired population density is reached and thereafter continuing the culturing under conditions which favor the production of flocculants for a time sufficient to achieve the desired soil aggregating properties.

These and various other objects of the invention will become apparent from the following detailed description of the invention when taken in reference with the accompanying drawings in which.

The ability of the algae to significantly improve soil structure depends upon proper application of nutrients and upon the maintenance of soil moisture within appropriate limits. As taught in our co-pending application, when nitrogen levels are high enough so that cellular nitrogen is at about 10% by weight, and the cells have an additional supply of other nutrients, *Chlamydomonas mexicana* cells are maintained in a vegetative growth state in which the cells rapidly multiply. By proper application of nutrients to the soil, dosages of from 0.5 to 5 lbs/acre of cells having a 10% nitrogen level will be maintained in the vegetative state for a number of days and the cell populations will increase several hundred fold resulting in from about 50 to 200 pounds of algae per acre. Toward the end of this period, cellular nitrogen levels fall to about 5% and the algae shift to a flocculant production phase during which up to 80% by weight of cell substance or about 25 to 160 pounds is an active flocculant. Significant soil improvement results even at the lower end of this range.

EXAMPLE I

Figure 1:
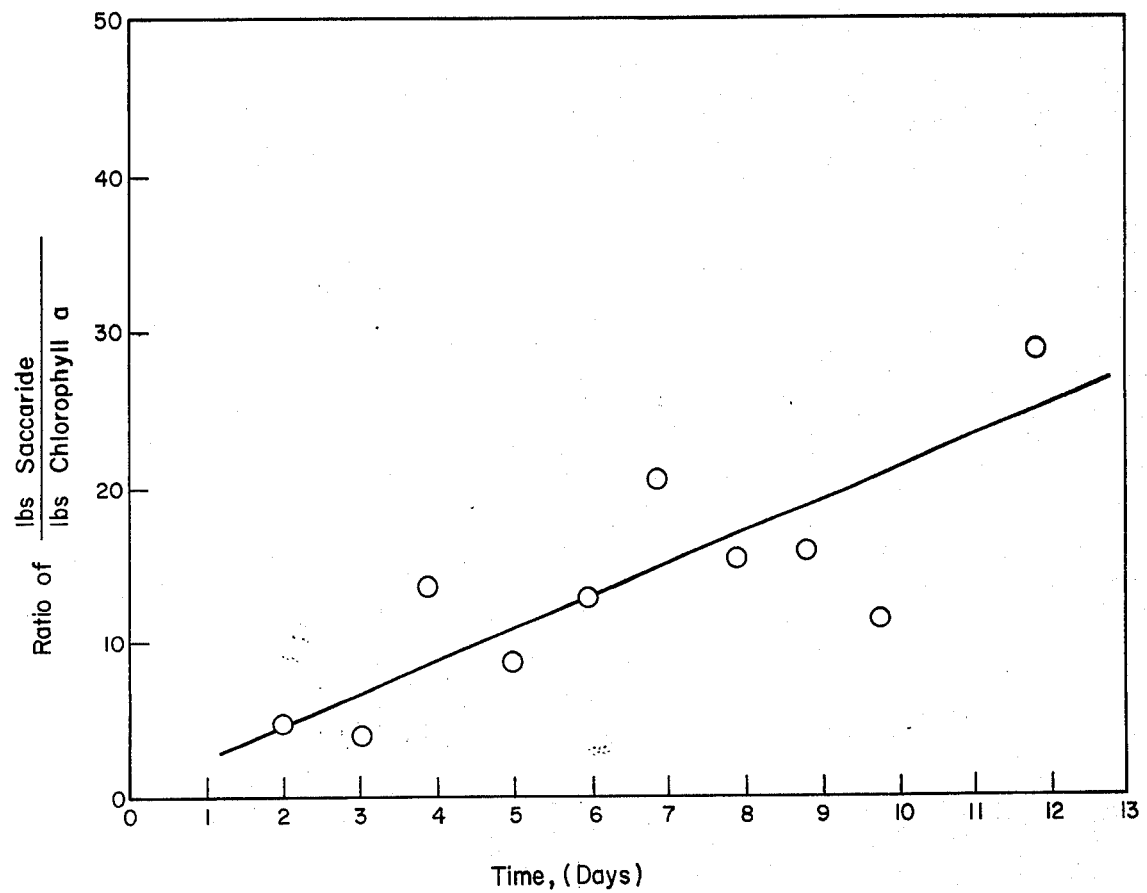
FIG. 1 is a plot showing the increase in the ratio of (flocculant chlorophyll) versus time.

In order to show the production of polysaccharide flocculants by algae on the soil, a sterile soil consisting of 70% sand and 30% clay, was prepared with no organic material being present in the sample so that the effect of background matter was eliminated. The samples were inoculated with a fertilizer medium formulated as disclosed in our co-pending application. Nitrogen as $NH_4NO_3$ was present in amount of 9.3 pounds N/acre and soil moisture was adjusted to 15% moisture content. *Chlamydomonas mexicana* was sprayed onto this soil at a dose level of about 0.7 lbs of algae per acre. Growth on the soil was monitored by analysis of chlorophyll *a* and soil polysaccharide (flocculant) over a 12 day period. Surface soil samples were obtained daily using a 1 cm diameter cork borer. Polysaccharide analysis was by the procedure outlined in our co-pending application Ser. No. 421,527. Chlorophyll *a* was determined by the method described in *Standard Methods for Examination of Water and Waste Water*, 13th Edition, modified by extraction in methanol rather than acetone. The ratio of saccharide to chlorophyll is plotted in FIG. 1. As can be seen in FIG. 1, the ratio of saccharide to chlorophyll *a* increased by day 4 and continued to increase with time as increased flocculant was produced and accumulated. Based on the nitrogen applied and the pounds of algae determined, the algae had a 10% nitrogen content until day 3 and became progressively more nitrogen deficient with time.

EXAMPLE II

The following trials show the influence of various factors on soil algae growth and consequent soil structure improvement. In carrying out the trials, the algal species *Chlamydomonas mexicana* was cultured as described in our copending application in liquid culture medium with sufficient nitrogen in the medium so that cellular nitrogen was maintained above 10% so that the cultures as applied to the soil were in a vegetative state. The primary variables in the trials were algae inoculum doses (three levels), fertilizer doses (three levels), and irrigation methods and rates (four levels). A total of 26 combinations of the above factors were investigated, each treatment being replicated three times. The irrigation methods employed were drip and spray. The field plot plan was a split plot, randomized block design. Each test plot was 81 ft² in area. Test plot soils were of a loam or sandy loam texture.

Chlorophyll determination was used as the basic measurement of algae growth. Difficulties were encountered in measuring algae growth in the filed plots. Although chlorophyll content is correlated with algae population densities to a certain degree, this relationship does not give a complete picture of population density of cultures in the flocculant producing state since chlorophyll content is decreasing in these cultures. Thus, it can be expected that algae in much larger numbers were present in inoculated plots during the later days of the trials than the data shows. Ten surface samples were obtained per plot. These were pooled, extracted and the pounds of chlorophyll *a* and chlorophyll *b* determined. Samples were taken approximately every 3 days for the duration of the trial (1 month). The pounds of algae were computed based on a known average chlorophyll content of 1.75%.

The basic measurement of soil structure utilized was wet sieving, a test designed to differentiate the water stability of soil aggregates under mechanical agitation. The parameter derived from the results of the wet sieving test is mean particle size, calculated as the weight average diameter of the tested soil as distributed between sieves of specified sizes. Measurements of mean particle size on field samples were taken before and after the algae growth phase of the example. A secondary indication of soil structure was derived from penetration resistance measurements. With the aid of a commercially available soil Penetrometer, produced by Soil Test, Inc., Evanston, Illinois, determinations of the force necessary to push a conically-tipped probe a distance of 2 inches into dry soil were made. This measurement is an indication of soil compaction and moisture, both of which are related to soil structure.

Although other irrigation methods may be employed, of the methods we have examined we have found that spray irrigation provides optimal algae growth and soil structure improvements. An application rate of approximately 1 inch/day of water was found to optimal for the mid-summer Arizona temperatures and humidities in which the tests were conducted. The results indicate that algae growth on soil is closely coupled with the dynamics of soil, water and nitrate transport. As is recognized in the art, excessive watering rates lead to nutrient depletion through leaching, while deficient watering rates lead to high surface temperatures and growth retardation. Under less severe climate conditions, the watering requirements would be lower and of a less critical determination in the overall process. As a guide, it can be said that soil moisture should be held at between about 40% and 80% of moisture holding capacity. This level of moisture may be most easily maintained with the use of irrigation during seasons of moderate temperatures and high humidities. Irrigation methods which provide for uniform dispersion over the area treated should be employed.

Figure 2:
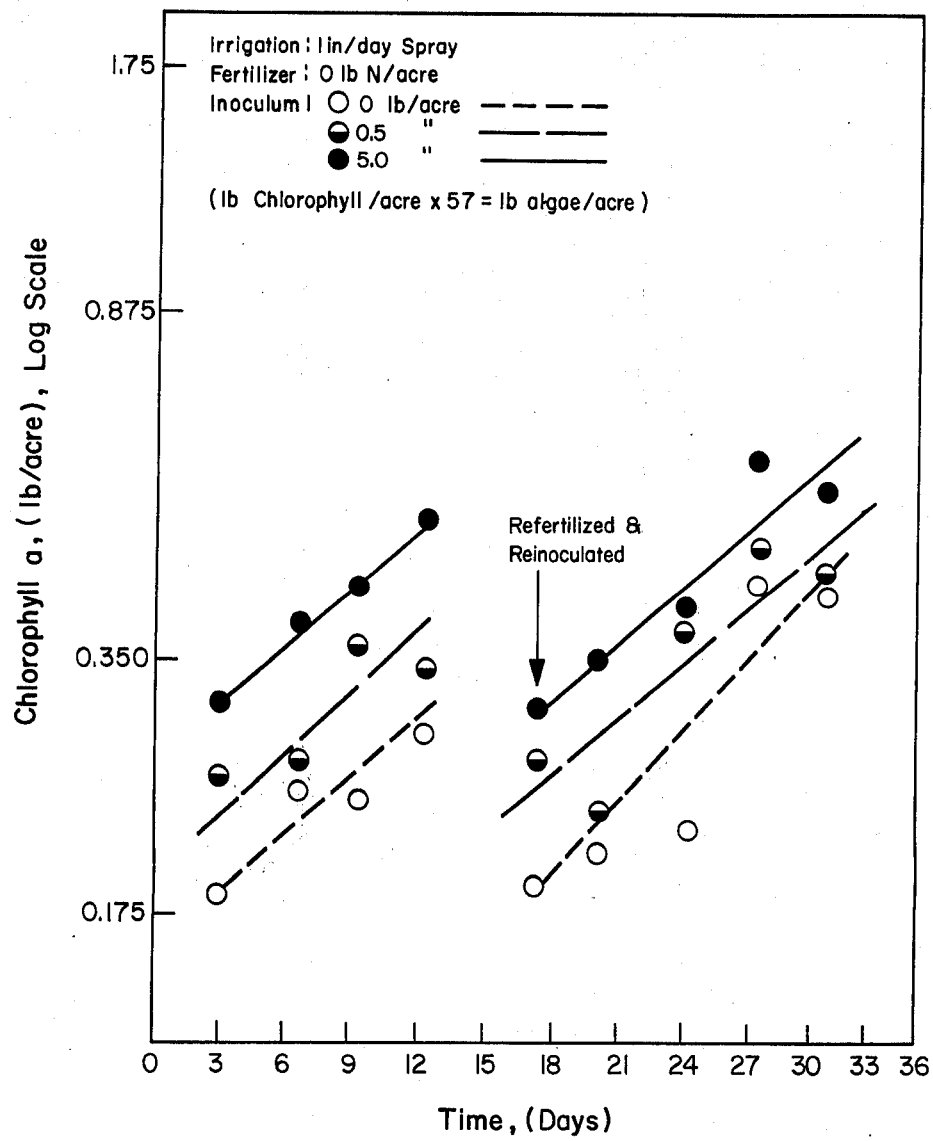
FIG. 2 is a plot illustrating algae growth on unfertilized soil for various application levels.
Figure 3:
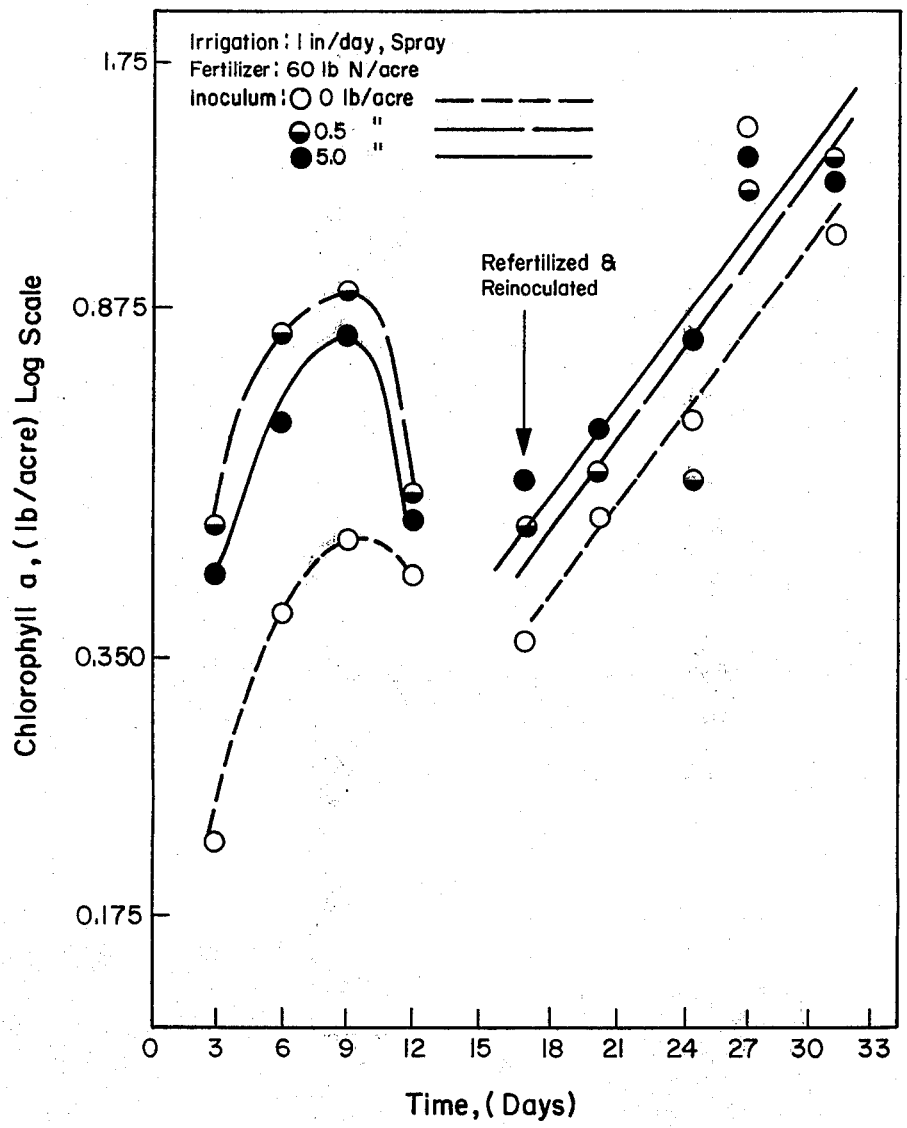
FIG. 3 is a plot illustrating algae growth on highly fertilized soils for various inoculation levels.

The algae growth data obtained with the optimum watering scheme are shown in FIGS. 1, 2 and 3. Between days 12 and 17 in the example, the water system was shut off. On day 17 irrigation was resumed and the plots re-inoculated. An analysis of variance indicates that algae levels were significantly influenced by both inoculum and fertilizer dose levels (95% level).

In order to demonstrate that the inoculated algae species was the one that actually grew, the effect of inoculum size on subsequent algae growth on unfertilized plots was studied. Results are presented in FIG. 2. These data show that the amount of algae present was greatest on those plots inoculated with the highest algae levels. Further, these results indicated that the inoculated algae was chiefly responsible for the observed growth. It is surmised that growth on the uninoculated plots result from a combination of factors, namely from contamination of the inoculated plots as well as with the growth of indigenous algae.

FIG. 3 shows the effect of fertilizer on algae growth on plots inoculated with 0.5 and 5 pounds per acre of C. mexicana. The results show that between day 3 and 12 the density of algae was greatest on the inoculated plots (0.5 and 5 pounds per acre). It can also be seen that 0.5 pounds per acre inoculum resulted in final algae densities equal to that of the 5 pounds inoculum. The decrease in chlorophyll levels of day 12 is attributed to the commonly observed effect of nitrogen limitation on algae growth. It is known that a nitrogen limitation (in this case caused by cellular uptake and leaching) results in a decrease in a chlorophyll content of algae. It can also be seen from data present in Example I and from our patent application Ser. No. 421,527 that C. mexicana biomass continues to increase when cells are placed under a nitrogen limitation. As a result, estimations of biomass based on chlorophyll determinations will be low during nitrogen deficiency. The small differences between the 0 algae dose and the 0.5 and 5 lb/acre dose seen between days 17 to 31 can be attributed to the gradual buildup of the algae flora during the first 2 weeks of the experiment.

Figure 4:
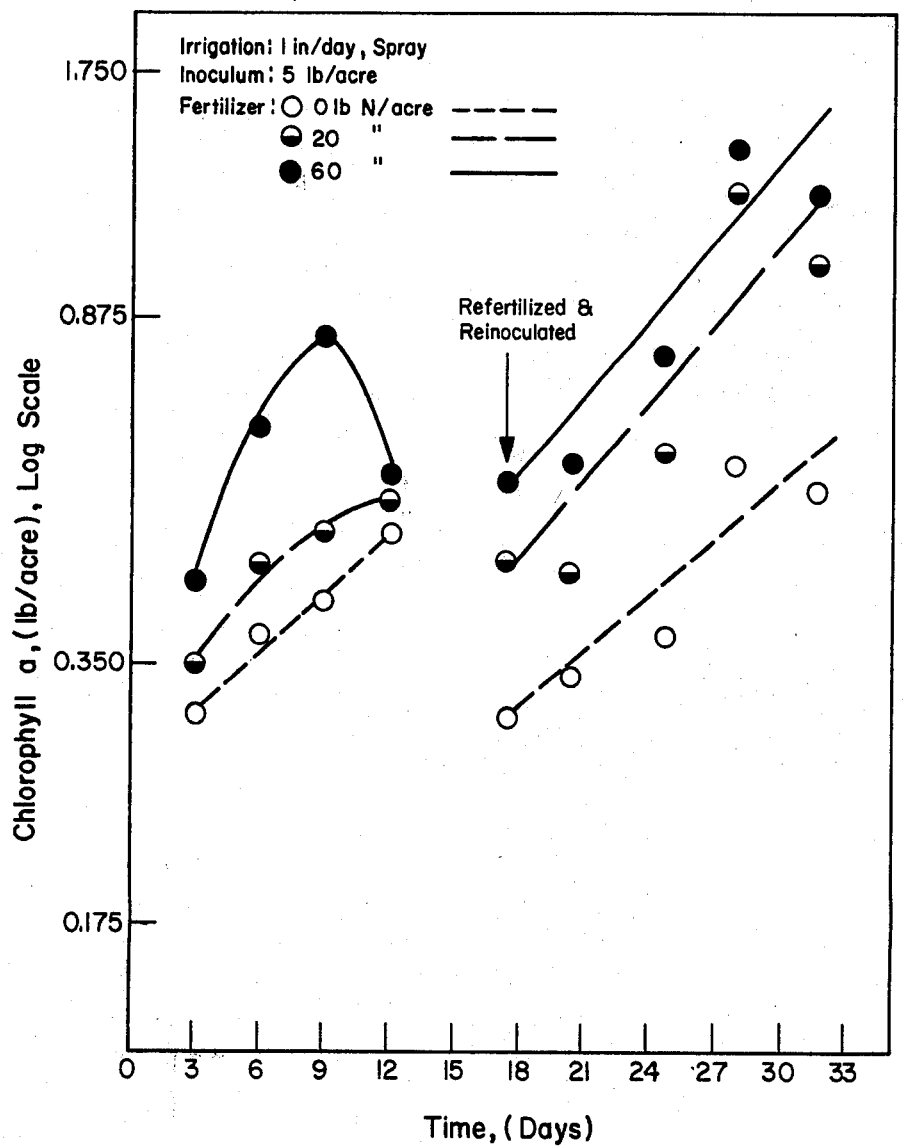
FIG. 4 is a plot of algae growth for various fertilizer levels.

The effect of varying nitrogen fertilizer levels on algae growth is shown in FIG. 4. The results clearly shown an effect on algae densities.

For standing crops of algae less than about 25 lb/acre, doubling times on the order of 0.5 – 8 days were observed. For standing crops between 50 and 150 lb/acre, doubling times on the order of 8 days were observed in the fertilized plots. The decrease in growth rate with increasing population can be explained by a number of factors, including depletion of nitrogen supply and surface crowding effects. The algae growth data indicated that with proper watering fertilization and inoculation at about 0.5 lb/acre, standing crops of algae of 50–100 lb/acre within a period of 1 to 3 weeks are achieved. As will be brought out hereinbelow, crops within this range of magnitude produce significant improvement in soil structure.

FIGS. 2 and 3 also show that algae grew on plots which were not inoculated in considerable quantities. Samples of the algae which grew on the uninoculated plots were cultured in the laboratory. The algae were identified as *Chlamydomonas mexicana* and *Nostoc commune*, a nitrogen fixing blue-green algae. It is surmised that contamination from the inoculated plots occurred during spray inoculation, although species of Chlamydomonas are native to the area where the tests were conducted and may have initially been present in the soil. However, the soil structure effects noted during the trials were mainly associated with the inoculated cultures as shown by penetration and particle size measurements.

Figure 5:
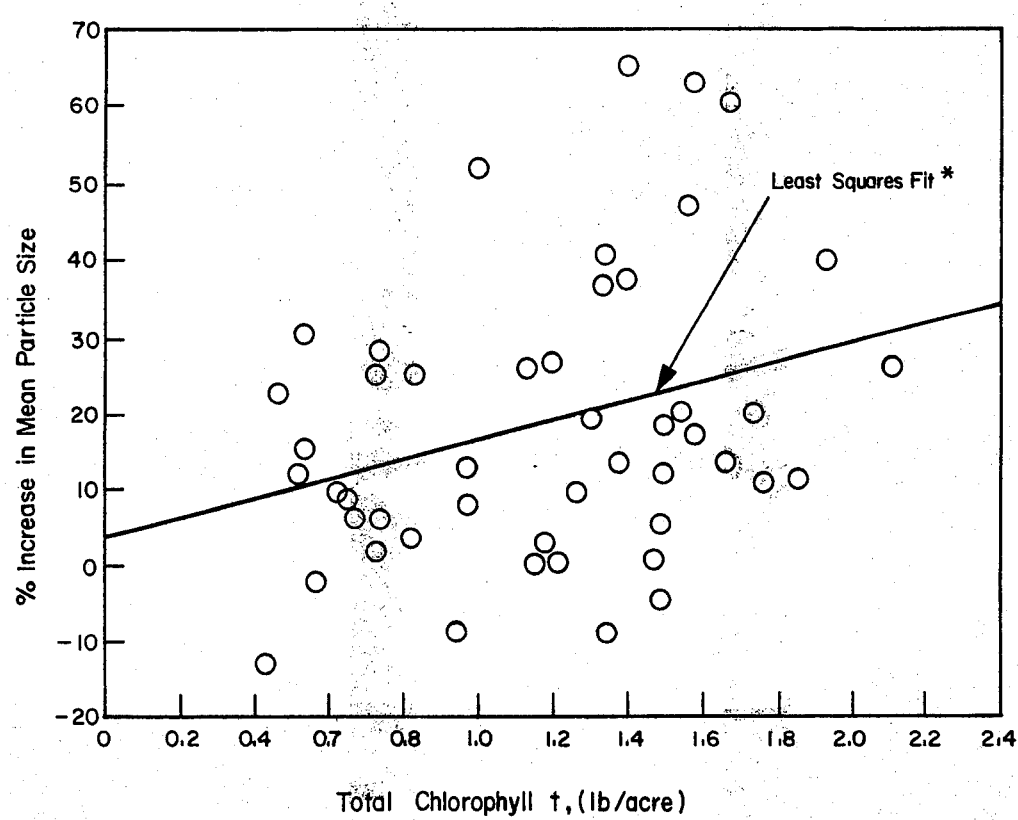
FIG. 5 is a plot of percent change in soil particle size versus pounds of chlorophyll extracted from flocculant producing algae grown on soil.
Figure 6:
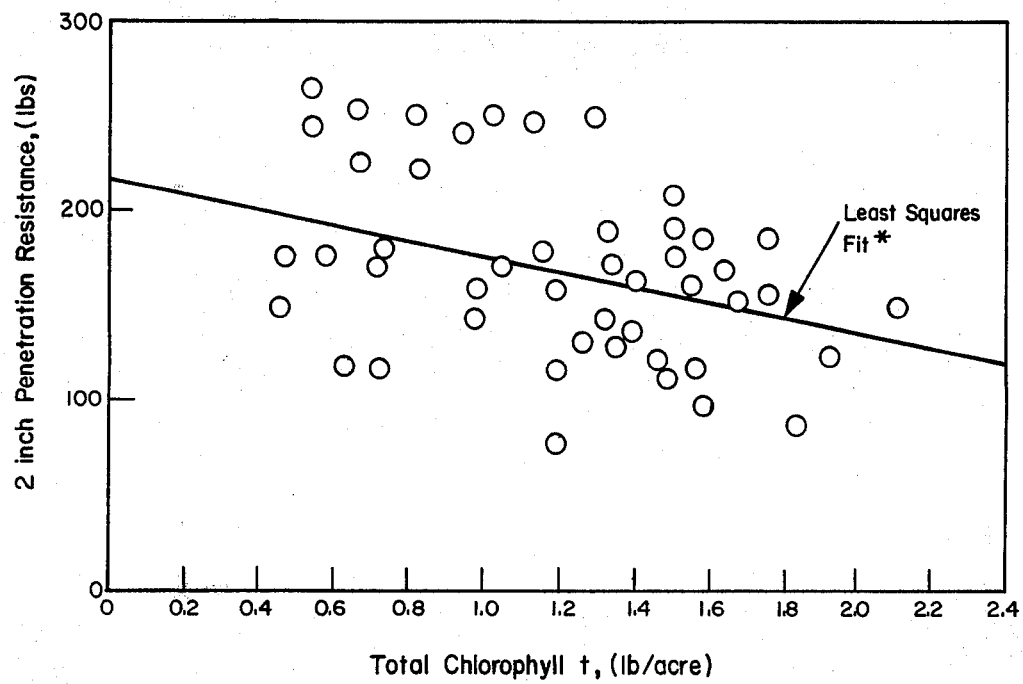
FIG. 6 is a plot of penetration resistance versus pounds of chlorophyll extracted from flocculant producing algae grown on soil.

The results of soil structure measurements are shown in FIGS. 5 and 6. FIG. 5 is a plot of the percent change in mean particle size (0–3 inches depth sample) vs. total density chlorophyll (lb/acre). The data shown are typical values for each spray irrigated treatment. A least squares fit of the date indicates that an algae growth of 100 lb/acre can be associated with a 28% increase in mean particle size.

This change in size produces a significant increase on soil pore size, and thus, improved soil aeration and infiltration capacity.

The results of the penetration measurements are shown in FIG. 6. A least squares fit of the data indicates that a growth of 100 lb/acre corresponds to a 32% decrease in penetration resistance, as compared with no algae growth. The measurements were made 2 weeks after the irrigation system had been shut off. All plots were essentially bone dry, so the measurements reflect primarily soil compaction.

The results indicate that field-grown algae can have a significant effect on soil structure. Under controlled irrigation and with proper fertilization, sufficient algae can be grown from an inoculum of 0.5 lb/acre to result in a 28% increase in particle size and a 32% decrease in soil penetration resistance within a period of about 3 weeks. With these improvements in soil structure, marked increase in soil pore space, infiltration rates and improved soil aeration will result.

Chart I shows the increases average particle size (mm) in all plots inoculated at 0, 0.5 and 5 pounds per acre under the optimal irrigation scheme.

CHART I

| Nitrogen Dose (lb N/acre) | Inoculum Algae Dose (lb/acre) | | |
|---|---|---|---|
| | 0 | .5/acre | 5/acre |
| 0 | .008 | .069 | .043 |
| 20 | * | * | .079 |
| 60 | .023 | .116 | .054 |

*These algae and fertilizer combinations were not investigated.

Plots were spray irrigated with 1 inch of water per day. All values are arithmetic means of three replications measured in mm. Average particle size before treatment was 0.344 mm.

From Chart I it can be seen that the inoculated cultures produce a significant effect on particle size as compared with the indigenous algae populations. Based on our analysis of the data we have gathered we have concluded that inoculum levels as low as 0.05 lb/acre produce growth levels similar to those disclosed herein and consequently will significantly influence soil structure.

In summary, flocculant producing algae of which a preferred genus is *Chlamydomonas*, especially the species *Chlamydomonas mexicana* are cultured in nurse pools on liquid nutrient medium under conditions which produce logarithmic or exponential growth. The cultures are harvested and applied to fields at application densities between .05 and .5 pounds per acre. If desired to facilitate handling, transportation and application at the required density, excess water may be removed by centrifuging. However, cultures of at least 0.5 grams/liter can be obtained in nurse pools using the nutrient mediums and culturing procedures described in our co-pending application. Application to fields should be made in a manner best suited to obtain substantially uniform dispersion of the algae over the plot being treated and may be by aerial spray or by application in admixture with irrigation water.

The amount of nitrogen and other nutrients added to the field will vary somewhat due to a large number of factors such as surface runoff, competition with other forms of plant life and nutrients in the soil but as a starting point it may be stated that 10 pounds of nitrogen should theoretically produce 100 pounds of algae with a cellular nitrogen content of 10%. In field trials, as indicated by results included herein and other data, we have found that applications from 20 to 60 pounds of nitrate nitrogen per acre to previously untreated and unfertilized fields results in a 100 fold or greater increase in the amount of algae at initial inoculation rates of about 0.5 to 5 pounds per acre when soil moisture is maintained at between 40 to 80% of moisture holding capacity. During the course of growth in the soil under this regime, the algae shift from a vegetative phase of growth to a flocculant producing phase as the cells become nitrogen deficient, provided moisture is present in adequate quantities and other nutrients are not limiting. Increase in particle size, and resultant increase in soil pore space, infiltration capacity and soil aeration result.

We claim:

1. A method of conditioning soil by binding the particles thereof into small workable aggregates which comprises inoculating the soil with a flocculant producing algae, maintaining in the inoculated soil available nitrogen, other nutrients and moisture in sufficient quantities so that the algae continue to multiply on the soil for a first period of time until a predetermined population density is reached, and thereafter maintaining in the inoculated soil plant nutrients other than nitrogen in quantities that are not growth limiting so that the algae continue to grow in a nitrogen deficient state in which soil aggregating compounds are produced.

2. A method according to claim 1 wherein the algae is of the genus Chlamydomonas.

3. A method according to claim 2 wherein the algae is *Chlamydomonas mexicana*.

4. A method according to claim 3 wherein rate of application of algae is at least 0.5 lb dry weight per acre with nitrogen being provided so that it is present in the soil in amounts of at least 20 lb per acre at the time of algae application.

5. A method of soil treatment which comprises inoculating soil with a flocculant producing algae while the algae are in the vegetative growth phase, maintaining in the inoculated soil a supply of nutrients and soil moisture in quantities which permit multiplication on the soil for a period of time so that a desired population increase is achieved on the soil, the nutrients being maintained in quantities sufficient to permit the algae to continue to grow on the soil for a second period of time under conditions of nitrogen deficiency and maintaining light, moisture and plant nutrients other than nitrogen in sufficient supply to cause the algae to produce flocculating agents during the second period of time.

6. A method according to claim 5, wherein the soil is inoculated with algae at a dosage of at least 0.5 pounds dry weight per acre.

7. A method of soil treatment which comprises inoculating soil with a flocculant producing algae, culturing the algae on the soil for a first period of time, adding supplemental plant nutrients and moisture to the inoculated soil as required to produce a multiplication of the algae on the soil during the first period of time until a desired population density is reached, the nutrients being added in quantities such that the algae become deficient in nitrogen after the first period of time, thereafter culturing the algae on the soil for a second period of time during which the algal flocculants are produced to bind the soil particles into workable aggregates.

8. A method according to claim 7 wherein the algal species is *Chlamydomonas mexicana*.

9. A method according to claim 8 wherein the soil is supplemented with moisture in sufficient quantities to maintain soil moisture at 40 to 80 percent of moisture holding capacity and to maintain soil surface temperatures less than 35°C.

* * * * *